Patented Apr. 7, 1936

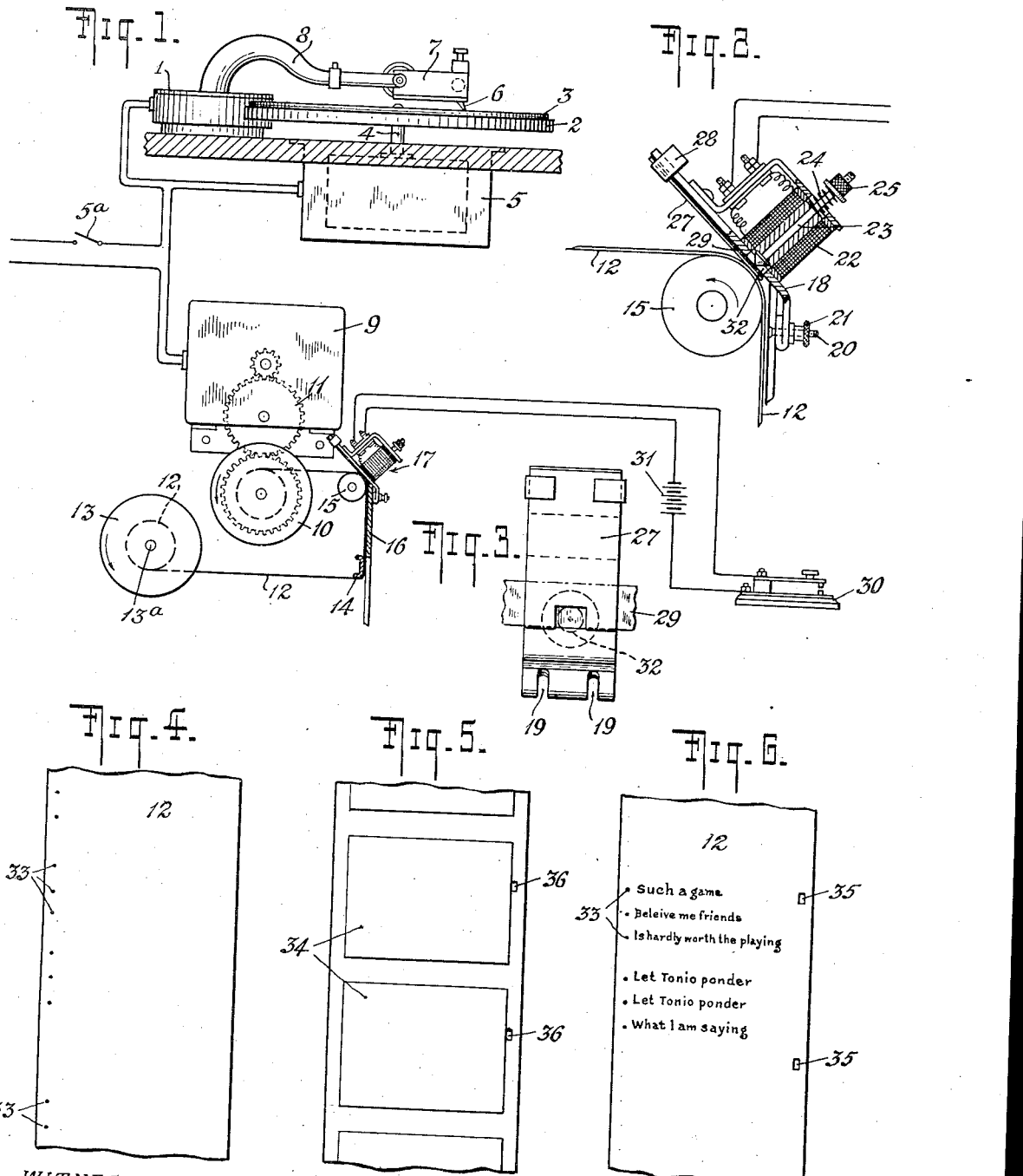

2,036,666

UNITED STATES PATENT OFFICE 2,036,666

ROLL BEARING REPRODUCIBLE MATTER THEREON AND METHOD OF PRODUCING THE SAME

Albert E. Wier, Brooklyn, N. Y.

Original application January 3, 1933, Serial No. 649,867. Divided and this application September 8, 1933, Serial No. 688,583

6 Claims. (Cl. 88—28)

The present invention relates to rolls bearing reproducible matter thereon such as writings, symbols, printed matter, musical scores, illustrations, etc., and the object of the invention is to produce rolls of this character having the material to be displayed arranged thereon in such manner that it may be projected in predetermined time relation with reference to an effect to be produced by sound reproducing and/or projection apparatus, such as is disclosed in my copending application Serial No. 649,867, filed January 3, 1933, which has become Patent No. 1,998,889, dated April 23, 1935, of which this application is a division.

According to my invention the reproducible matter is arranged on the roll, in the case where text or printed matter is to be displayed upon a screen, so that upon projection of such matter, the reader can sit at ease and observe, without strain or difficulty, the enlarged words and letters of the text as they unfold themselves line after line. In the case of a lecture or the like, the text may be synchronized with illustrations carried by a second roll and arranged to appear on the screen at the appropriate moments and to remain visible for as long a period as the editor may decide to allow. The same is true in the case of a musical composition or an opera, in which case the text on the roll is synchronized with the music reproduced, the text being so arranged on its roll that it appears on the screen in exact correspondence with the individual musical passages to which it is related, while illustrations of typical sections may be so arranged on the same or on another roll that they appear as the actions or scenes to which the music is pertinent undergo a change in the manner described in my aforementioned application.

For the purposes of illustration, the invention will be described in the following specification by way of example as employed in the production of rolls having text and illustrations which are to be used in the reproduction of an opera, since such rolls will illustrate the preferred forms of my invention.

Referring to the accompanying drawing which illustrates the invention without defining its limits, Fig. 1 is a diagrammatic view of the entire apparatus used in preparing the rolls; Fig. 2 is an enlarged detail of the means employed for recording or marking the proper position of the text on the roll; Fig. 3 is an elevation of the bottom of the recording end of the device, looking from the left in Fig. 2 toward the point of the recording stylus; Fig. 4 represents the text roll master sheet as marked by the recording stylus of Fig. 2 and in condition for receiving the text shown in Fig. 6; Fig. 5 represents a portion of an illustration or picture roll which may be used with the text roll; and Fig. 6 is a portion of the completed text roll.

As shown in Fig. 1 of the drawing, the apparatus utilized in the production of the rolls bearing the text of the opera comprises conventional sound reproducing mechanism such as shown in my aforementioned application, of which only such portion is shown as is deemed necessary for the understanding of the present invention and is designated generally by the numeral 1. The customary turntable 2 upon which is placed the disc record 3 to be reproduced is supported by a vertical shaft or spindle 4, the latter of which is driven by a suitable motor 5. A reproducing needle 6 is shown mounted in a needle carrier 7 journalled in the forked ends of the tone arm 8. The motor 5 is synchronized with a motor 9 which rotates a take up reel 10 in a counter-clockwise direction, as viewed in Fig. 1, through the train of gears 11. A roll of paper 12 which is to be marked as will be hereinafter explained, is wound on a reel 13, the latter being mounted on a support such as the shaft 13ᵃ, while the device is in operation. The paper strip of the roll 12 is threaded over a plate 14 having rounded corners and around the roller 15, the end of the paper strip being attached in any convenient manner to the take up reel 10. The effective surface of the roller 15 is set back from the supporting side plate 16 for a distance slightly greater than the thickness of the paper strip, so that the paper in passing over the roller 15 does not come into contact with the plate 16. A recording instrument 17 is supported on the upper edge of the plate 16 in operative relation with the effective surface of the roller 15 so as to be in a position to affect the paper 12 as it passes over the roller 15. As shown in Figs. 2 and 3, the instrument 17 comprises a supporting plate 18 provided with grooves 19 which fit over the threaded studs 20 provided on the plate 16. The plate 18 is securely held in place on the studs 20 by the knurled nuts 21.

The body portion of the plate 18 is angularly disposed with respect to the side plate 16, so as to extend over and lie closely adjacent to the roller 15, and rests on the upper edge of such side plate which is preferably bevelled to present a flat supporting surface to the angularly disposed body portion of the plate 18. Mounted on the supporting plate 18 is a solenoid 22 which when energized causes the solenoid stylus 23 to move toward the roller 15 through an aperture 32 provided in the plate 18 against the pressure of a spring 24; the spring 24 is of sufficient strength to return the stylus to its normal position when the current to the solenoid is cut off and may be adjusted by means of a nut 25 threaded on the upper end of the stylus 23. A plate 27 associated with the supporting plate 18 by the clips 28 supports a strip of carbon paper or ribbon 29 under the aperture 32 in proper position with relation to the stylus 23 and the paper strip 12. Thus when the switch 30 is closed, current from the battery 31 energizes the solenoid 22 causing the solenoid stylus 23 to move down through the aperture 32 in the plate 18 and press down upon the carbon paper, thereby making marks on the paper strip 12. The carbon paper or ribbon 29 may be shifted by hand as it becomes worn.

The preparation of the text and illustration rolls to be used in the reproduction of an opera is initiated by an editor, musically skilled, who first selects the particular opera to be reproduced, for instance "Pagliacci". Complete sets of records, reproducing the entire opera, are available from several sources and the reproduction of the opera in each set generally differs to some degree from the reproduction or rendition thereof in any other set. The editor, after selecting the particular set he wishes to reproduce in connection with text and/or illustrations, marks on the score of the opera the beginning of each phrase of the text and also, when desired, the beginning of each musical passage, without text. He then places record number 1 on the turntable 2. A roll of blank paper wound on a reel 13 is inserted in its proper place on the shaft or spindle 13a and the end thereof threaded around the plate 14, the roller 15, and attached in any suitable manner to the take up reel 10. The editor now closes the switch 5a to start the phonograph motor 5 and also the paper unreeling motor 9 to cause the paper 12 to be drawn from the reel 13 on to the reel 10. As stated before, the motors 5 and 9 are synchronized one with the other, so that the phonograph record 3 is rotated and the paper strip unwound at correlated rates of speed. The needle is then placed on the record in the usual manner to start playing the record. A mark may be placed on the sheet to indicate the beginning of the playing of the record. Exactly at the beginning of each sung phrase as reproduced by the phonograph, the editor depresses the switch 30, energizing the solenoid 22 and causing the solenoid stylus 23 to press down upon the carbon paper 29, making marks 33 on one edge of the paper strip as shown in Fig. 4. The depression of the switch 30 is merely a momentary one at the beginning of each phrase of the text as marked out by the editor on the opera score. For example, in a portion of the text of Pagliacci which reads as follows:

"Such a game, believe me friends, is hardly worth the playing. Let Tonio ponder, let Tonio ponder what I am saying,"

the editor will mark out the beginning of the phrases on the score and will then record by marks 33 on the paper 12 the beginning of each phrase as it is reproduced by the phonograph in the following manner:

. Such a game
. Believe me friends
. Is hardly worth the playing
. Let Tonio ponder
. Let Tonio ponder
. What I am saying Proceeding in this manner through the entire record, it is obvious that the spacing between marks 33 will not always be uniform but will be in exact synchronism with the beginning of each phrase of the text as it is reproduced by the phonograph. Whenever in such a record there are passages of orchestration unaccompanied by text there will be no marks 33 at all, but just as soon as one of the characters in the opera begins to speak or sing, the placing of the dots 33 again begins. After the editor has placed the marks 33 on the paper sheet 12 as described, and the record has finished playing, the reels 10 and 13 may be removed from their spindles and the paper sheet rewound from reel 10 onto reel 13. Usually, however, a single paper roll accommodates the entire opera as reproduced on a series of disc records, so that the editor merely changes the records and goes on with making marks 33 until the end of the opera is reached. The editor thereupon applies the actual words of the several phrases of the text to the paper sheet 12 near the marks 33 generally in the manner illustrated in Fig. 6. As most operas are written and sung in a language other than English the words applied to the paper are English so that a person without an understanding of the language of the opera will readily understand the story. Preferably the text is a singing version, so that a listener with imagination can fit the rise and fall of the melodic line to the English syllables, providing an unmistakable guide to the progress of the music.

At appropriate places of the performance whenever a change of scene is involved or illustrations are to appear, the editor indicates this condition by making an appropriate mark on the paper strip 12 or punching a perforation 35 in such strip adjacent one edge thereof, as shown in Fig. 6. The illustrations are generally a series of pictures prepared in advance to cover the salient situations involved in the visualization of scenes of that part of the opera which the particular phonograph record reproduces. As several of these illustrations may be selected for reproduction during orchestral passages, i. e. during pauses in the vocal reproduction, the editor will make marks or perforations 35 on the paper strip 12 adjacent such portions of the orchestral passages where a change of scene is involved. Thus, the illustrations appear sometimes in association with text and at other times in association with music unaccompanied by text. The illustration roll is made up, generally speaking, in the manner illustrated in Fig. 5, the several illustrations 34 to be used being mounted or printed in sequence on a strip of paper. As described in my aforementioned copending application, the perforations or apertures 35 of the text roll 12 also serve the purpose of controlling the feed of the illustration roll during the reproduction of the opera by allowing an electrical connection to be made, thus closing the circuit containing the illustration motor which when energized causes the appropriate illustration to be advanced. The illustration roll is also provided with apertures 36 adjacent to each picture which when the advancing illustration has advanced almost to its proper position for projection, allows a second electrical connection to be made causing electrical mechanism to operate to interrupt the operation of the illustration motor. The apertures 36 are so positioned with relation to the illustrations that the momentum of the armature of the illustration motor after the circuit is broken is sufficient to advance the particular illustration to be shown to its proper position for projection as described in my copending application. While I have specifically described and shown perforations or apertures on the rolls for controlling the advancement of the illustration roll during the projection thereof, it is obvious that other methods may be employed, such as treating the paper strips at the appropriate places so that the paper will readily act as a conductor.

The master rolls having been produced in this fashion are then accurately reprinted with respect to the spacing of the reproducible matter thereon and the perforations for the appropriate appearance or change in the illustrations. The printed reproductions of these rolls are then ready for distribution for use by operators generally in reproducing mechanism such as is disclosed in my aforementioned copending application. The editor may in the first instance reproduce in connection with each set of records of each opera as prepared by each one of the several manufacturers of phonograph discs the steps thus far recited, but this initial labor once performed will stand good for as many reproductions or printed rolls as there may be demand for. The user of course will use printed rolls appropriate to the particular make of record which he uses, said rolls to be appropriately marked to identify them with the several makes of records.

The invention contemplates also the provision of a roll having educational or informatory matter thereon as in the case of a lecture or story which when projected upon a screen in the manner disclosed in my copending application will be received by the human eye without strain or effort in such manner as to be impressed on the mind. When a text roll is to be prepared having thereon a continuous lecture, story, or book, which will be reproduced without the accompaniment of music, the individual lines of the text are printed so that they will be closer together at the beginning of the lecture than at the end, the spacing gradually increasing in accordance with the increasing rapidity at which the roll will be fed in the reproduction thereof due to the building up of the text paper on its wind-up reel which, gradually growing larger, naturally draws the paper from the text roll more rapidly as the end of the roll approaches. The relation of the printed matter on the roll with reference to the speed of feed at which it will be reproduced should be such that a speed of approximately one hundred and seventy-five to two hundred and seventy-five words per minute will be fed to the screen. At this rate, as experiments have determined, the human eye can comfortably and without strain follow the reproduced text and without any noticeable effect as between the relatively slower feed when the text roll is fully wound and its take up roller just beginning to function, and when the text roller is almost unwound and its take up roller almost filled.

I claim:

1. The method of preparing a master text roll, the contents of which are to be projected in a continuous and uninterrupted sequence in a vertical direction on a screen and in synchronous agreement with the words or music reproduced from a sound record, which comprises unwinding a blank roll simultaneously and in synchronism with the playing of the record, causing dots to be produced on the moving strip of said roll adjacent one edge thereof and in exact coincidence with the beginnings of predetermined phrasing of the text or music reproduced, and applying the selected phrases in vertical alignment on said roll, each phrase being placed adjacent to its corresponding dot so that upon the exhibiting of such roll in synchronism with the playing of the record, the selected phrases move vertically along the screen as the music develops, in exact correspondence with the individual musical passages to which they are related.

2. The method of preparing a roll of reading matter and a roll of illustrations for display in conjunction with a phonograph, which comprises unwinding a blank roll simultaneously and in synchronism with the playing of a sound record, causing marks to be produced on the moving strip of said roll adjacent to one edge thereof and in exact coincidence with the beginnings of predetermined phrasing of the passages sung or played on the record, inserting the selected phrases in vertical alignment on said roll and adjacent to their respective marks, making a second set of marks on said strip to indicate where the appropriate illustrations for said phrases should appear, and inserting the appropriate illustrations on a second roll in correspondence with the respective marks on said first mentioned roll, whereby upon the reproduction of said roll of reading matter, said roll of illustrations and said record, a composite synchronized visual and audible effect is produced.

3. The method of preparing a roll of reading matter to be continuously and uninterruptedly displayed in a vertical direction on a screen by a reproducing machine and a roll of illustrations to be displayed intermittently on such screen in conjunction with said reading matter, which comprises placing phrases or lines of the reading matter in vertical alignment on a blank roll according to a predetermined arrangement, making said roll unobstructive to the passage of electric or light energy at appropriate places where a change of illustrations are to appear so that, as the roll is being projected, it intermittently allows such energy to pass therethrough, thereby causing the illustration roll to advance the illustration appropriate to the reading matter being exhibited and inserting the appropriate illustrations on a second roll in the proper order in which they are to appear, making said second roll unobstructive to the passage of electric or light energy at appropriate places adjacent to said illustrations, so that when the illustration roll has advanced to the proper position for exhibition of the appropriate illustration, said roll will allow such energy to pass therethrough and cause the feed of said illustration roll to be interrupted.

4. A roll made of non-transparent material such as paper and having reproducible visible matter thereon consisting of vertically arranged, variably spaced phrases or lines of reading matter coordinated in sequence with reproducible illustrative matter successively arranged on another roll and adapted to be exhibited continuously and uninterruptedly in a slowly advancing sequence on a screen in connection and simultaneously with said illustrative matter, said roll having variably spaced portions thereof unobstructive to the passage of electric or light energy for controlling the projection of said illustrative matter so spaced that the variably spaced reading matter is exhibited in coordination with appropriate illustrative matter.

5. A roll made of non-transparent material such as paper and having vertically arranged, variably spaced lines of reading matter thereon which are coordinated in sequence with matter reproducible for visual apprehension by a reproducing means and adapted to be exhibited continuously and uninterruptedly in a slowly advancing sequence on a screen in connection with the operation of such reproducing means, said roll having portions thereof unobstructive to the passage of electric or light energy for controlling the operation of said reproducing means, said portions being variably spaced along one edge of said roll at predetermined intervals where a change of visual matter is to appear so that as said roll of printed matter is being continuously projected, it intermittently causes said reproducing means to advance the appropriate visual matter to be coordinated with the printed matter.

6. A roll made of non-transparent material such as paper and bearing reproducible visible matter consisting of vertically arranged, variably spaced lines of reading matter interpreting an opera reproduced by an audible reproducing means, said reading matter presenting the libretto of said opera and coordinated in spacing and in sequence with the audible matter and adapted to be exhibited continuously and uninterruptedly in a slowly advancing sequence on a screen in connection and simultaneously with the reproduction of said audible matter so that a listener can fit the rise and fall of the audible melodic line to said visible reading matter, and a plurality of predeterminately variably spaced perforations arranged along one edge of said roll for controlling the feeding of a roll of reproducible illustrative matter conveying the action of the opera in such manner that as the libretto and music of the opera are developed appropriate illustrations conveying the action are intermittently advanced into position for projection.

ALBERT E. WIER.